(12) United States Patent
Kato

(10) Patent No.: US 7,367,761 B2
(45) Date of Patent: *May 6, 2008

(54) TOOL, TOOL HOLDER AND MACHINE TOOL

(75) Inventor: Yasunori Kato, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/580,853

(22) Filed: Oct. 16, 2006

(65) Prior Publication Data

US 2007/0036625 A1    Feb. 15, 2007

Related U.S. Application Data

(62) Division of application No. 11/341,666, filed on Jan. 30, 2006, now Pat. No. 7,140,818, which is a division of application No. 10/949,342, filed on Sep. 27, 2004, now Pat. No. 7,052,219, which is a division of application No. 10/268,987, filed on Oct. 11, 2002, now Pat. No. 6,808,345.

(30) Foreign Application Priority Data

| Oct. 16, 2001 | (JP) | ............................... 2001-318339 |
| Nov. 21, 2001 | (JP) | ............................... 2001-356506 |
| Nov. 22, 2001 | (JP) | ............................... 2001-357577 |

(51) Int. Cl.
*B23C 1/00* (2006.01)
*B23Q 3/157* (2006.01)

(52) U.S. Cl. ............... 409/230; 409/187; 409/194; 483/12; 483/9; 408/16; 408/9

(58) Field of Classification Search ........ 409/230–234, 409/144, 186–187, 193–194, 207; 483/12, 483/9; 408/16, 8–9, 238, 239 R, 240, 124, 408/239 A
See application file for complete search history.

(56) References Cited

U.S. PATENT DOCUMENTS 3,752,595 A    8/1973    Woythal et al.

(Continued)

FOREIGN PATENT DOCUMENTS

GB    2 014 332    8/1979

(Continued)

OTHER PUBLICATIONS

Machine Translation for JP-2001-079727-A, 6 pages.*

(Continued)

*Primary Examiner*—Erica Cadugan
(74) *Attorney, Agent, or Firm*—Pillsbury Winthrop Shaw Pittman, LLP

(57) ABSTRACT

A tool attachable to a spindle of a machine tool in the same way as an ordinary tool, capable of being driven without connecting with an external power supply etc., giving a higher rotational speed than that of the spindle of the machine tool without supplying electric power from the outside, and able to be changed automatically, provided with a machining tool for machining a workpiece, a motor for driving the machining tool, a generator for generating electric power to drive the motor by the rotation of the spindle, a rotational speed detecting device for detecting the rotational speed of the motor, and a rotational speed display for displaying the rotational speed detected by the rotational speed detecting device so as to be visually recognized from the outside of the attachable tool.

5 Claims, 9 Drawing Sheets

U.S. PATENT DOCUMENTS

| | | | |
|---|---|---|---|
| 4,077,736 A | 3/1978 | Hutchens | |
| 4,410,846 A * | 10/1983 | Gerber et al. | 408/16 |
| 4,716,657 A | 1/1988 | Collingwood | |
| 4,741,650 A | 5/1988 | Nakata | |
| 4,805,404 A | 2/1989 | Dupin | |
| 5,155,473 A | 10/1992 | Oketani et al. | |
| 5,564,872 A | 10/1996 | Veil et al. | |
| 5,636,949 A | 6/1997 | Nakamura et al. | |
| 5,692,998 A * | 12/1997 | Weigel | 483/12 |
| 5,697,739 A | 12/1997 | Lewis et al. | |
| 6,474,913 B2 | 11/2002 | Katoh et al. | |
| 6,474,914 B1 | 11/2002 | Lang | |
| 6,579,215 B2 | 6/2003 | Katoh et al. | |
| 6,633,379 B2 | 10/2003 | Roesner et al. | |
| 6,682,277 B2 | 1/2004 | Endo et al. | |
| 6,746,188 B2 | 6/2004 | Watanabe | |
| 6,752,750 B2 | 6/2004 | Adachi et al. | |
| 6,823,602 B2 | 11/2004 | Noureldin et al. | |
| 2001/0049325 A1 | 12/2001 | Katoh et al. | |
| 2002/0183178 A1 | 12/2002 | Katoh et al. | |
| 2003/0073553 A1 | 4/2003 | Endo et al. | |
| 2003/0102287 A1 | 6/2003 | Katsumata et al. | |
| 2004/0012359 A1 | 1/2004 | Katoh et al. | |

FOREIGN PATENT DOCUMENTS

| | | |
|---|---|---|
| JP | 56-91682 | 7/1981 |
| JP | 60-7943 | 1/1985 |
| JP | 363109941 A | 5/1988 |
| JP | 64-2567 | 1/1989 |
| JP | 3-52588 | 3/1991 |
| JP | 4-278867 | 10/1992 |
| JP | 5-56556 | 3/1993 |
| JP | 5-177485 | 7/1993 |
| JP | 9-168227 | 6/1997 |
| JP | 2001-16884 | 1/2001 |
| JP | 2001-79727 | 3/2001 |
| WO | WO00/61329 | 10/2000 |

OTHER PUBLICATIONS

Office Action for Patent Application No. 2001-318339 dated Feb. 21, 2006.

Office Action for Patent Application No. 2001-356506 dated Mar. 7, 2006.

Office Action for Patent Application No. 2001-357577 dated Mar. 7, 2006.

Machine Translation of JP05-177485 A, which JP 1485 was published as Jul. 1993.

* cited by examiner

TOOL, TOOL HOLDER AND MACHINE TOOL

CROSS-REFERENCE TO RELATED APPLICATIONS

This is a divisional of U.S. application Ser. No. 11/341,666, filed Jan. 30, 2006, now U.S. Pat. No. 7,140,818, which is a divisional of U.S. application Ser. No. 10/949,342, filed Sep. 27, 2004, now U.S. Pat. No. 7,052,219, which is a divisional of U.S. application Ser. No. 10/268,987, filed Oct. 11, 2002, now U.S. Pat. No. 6,808,345, which claims priority from Japanese Patent Application Nos. 2001-318339, filed Oct. 16, 2001, 2001-356506, filed Nov. 21, 2001, and 2001-357577, filed Nov. 22, 2001, the entire contents all of which are incorporated herein by reference.

BACKGROUND OF THE INVENTION

1. Field of the Invention

The present invention relates to a tool to be attached to a spindle of a machine tool for machining a workpiece.

2. Description of Related Art

In for example a machining center or other machine tool provided with a spindle, the maximum rotational speed of the spindle is determined by the structure of a main bearing rotatably supporting the spindle and a lubrication system of this bearing. For this reason, when it is necessary to rotate a tool at a higher rotational speed than the maximum rotational speed of the spindle, an accelerating apparatus is used.

As the accelerating apparatus, for example, an accelerating apparatus provided with a gear mechanism such as epicyclic gearing which holds the tool and is removably attachable to the spindle is well known.

For example, in a machining center, when it is desired to increase the rotational speed of the tool to higher than the maximum speed of the spindle temporarily, an accelerating apparatus such as the above accelerating apparatus is attached to the spindle in the same way as an ordinary tool to enable the tool to be rotated at a higher rotational speed.

However, when raising the rotational speed of the tool to a higher speed than the maximum rotational speed of the spindle by the above gear mechanism, the accelerating apparatus increasingly generates heat at a super high rotational speed such as tens of thousands to hundreds of thousands of revolutions per minute, so the machining tolerance of the noise from the accelerating apparatus can also increase. Furthermore, a highly reliable precision structure able to withstand the above super high rotational speed is required for the accelerating apparatus, so there is the disadvantage that the manufacturing cost becomes relatively high.

Further, in a case of an accelerating apparatus with a gear mechanism, it is needed to lubricate the gear or bearing and arrange a supply passage and a discharge passage for the lubricating oil in the accelerating apparatus, so there is the disadvantage that the apparatus becomes larger and it is difficult to automatically change the tool by an automatic tool changer.

SUMMARY OF THE INVENTION

An object of the present invention is to provide a tool and a tool holder to be removably attached to a spindle of a machine tool in the same way as an ordinary tool, capable of operating without connecting an external power supply etc., giving a higher rotational speed than that of the spindle of the machine tool, and automatically changing a tool.

Another object of the present invention is to provide a machine tool provided with the above tool and tool holder.

According to a first aspect of the present invention, there is provided a tool attachable to a spindle of a machine tool comprising a machining tool for machining a workpiece; a motor for driving the machining tool; a generator for generating electric power to drive the motor by the rotation of the spindle; and a breaking means for breaking a supply line of electric current from the generator to the motor when electric current over a predetermined value flows in the supply line.

According to a second aspect of the present invention, there is provided a tool attachable to a spindle of a machine tool comprising a machining tool for machining a workpiece; a motor for driving the machining tool; a generator for generating electric power to drive the motor by the rotation of the spindle; a control means for controlling a supply of electric power generated by the generator to drive and control the machining tool; and a driving state detecting means for detecting the state of the motor; wherein the control means drives and controls the motor based on the information detected by the driving state means.

According to a third aspect of the present invention, there is provided a tool attachable to a spindle of a machine tool comprising a machining tool for machining a workpiece; a motor for driving the machining tool; a generator for generating electric power to drive the motor by the rotation of the spindle; a light signal generation means for generating light signal in accordance with the rotational speed of the motor; and a light guiding means for guiding light into the light signal generation means from outside to output the light signal by the light signal generation means to the outside.

According to a fourth aspect of the present invention, there is provided a tool attachable to a spindle of a machine tool comprising a machining tool for machining a workpiece; a motor for driving the machining tool; a generator for generating electric power to drive the motor by the rotation of the spindle; a rotational speed detecting means for detecting the rotational speed of the motor; and a rotational speed displaying means for displaying the rotational speed detected by the rotational speed detecting means so as to be visually recognized from the outside.

In the first aspect of the present invention, the tool attachable to the spindle is provided with a generator and a motor, generates electric power using the rotation of the spindle, drives the motor with the generated electric power, and rotates the cutting tool. By this, it becomes possible to drive the tool without connecting with the external power supply, etc. and also change automatically the tool.

Further, the tool of the present invention generates electric power using the rotation of the spindle. Due to this, even when the cutting tool is overloaded while machining, the spindle is driven continuously. So, there is a possibility that the excessive current flows in the generator or the. Accordingly, in the present invention, if the current over predetermined value flows the supply line from the generator to the motor, the generator and the motor are protected by breaking the supply line.

In the second aspect of the present invention, the driving state of the motor is detected by the driving state detecting means and is fed back to the control means to control the motor. By this, it becomes possible to control the tool independently of the spindle, variously and precisely.

In the third aspect of the present invention, the tool is provided with a light signal generating means and a light guiding means and generates light signal in response to the rotational speed of the motor by the light generating means using light input from outside, and outputs the light signal to outside. By detecting the rotational speed of the motor based on the output light signal, a light source or a light receiving device is not necessarily built in the tool and it becomes possible to make the tool compact.

In the fourth aspect of the present invention, the tool attached to the spindle is provided with a generator and a motor, generates electric power by the rotation of the spindle, and drives the motor with the generated electric power to rotate the cutting tool. When the motor rotates, the rotational speed is detected by the rotational speed detecting means and is displayed visually recognizably by the rotational speed display means. Due to this, it is possible to grasp easily the driving state of the tool.

BRIEF DESCRIPTION OF THE DRAWINGS

These and other objects and features of the present invention will be more apparent from the following description of the preferred embodiments given in relation to the accompanying drawings, wherein.

DESCRIPTION OF THE PREFERRED EMBODIMENTS

Figure 1:
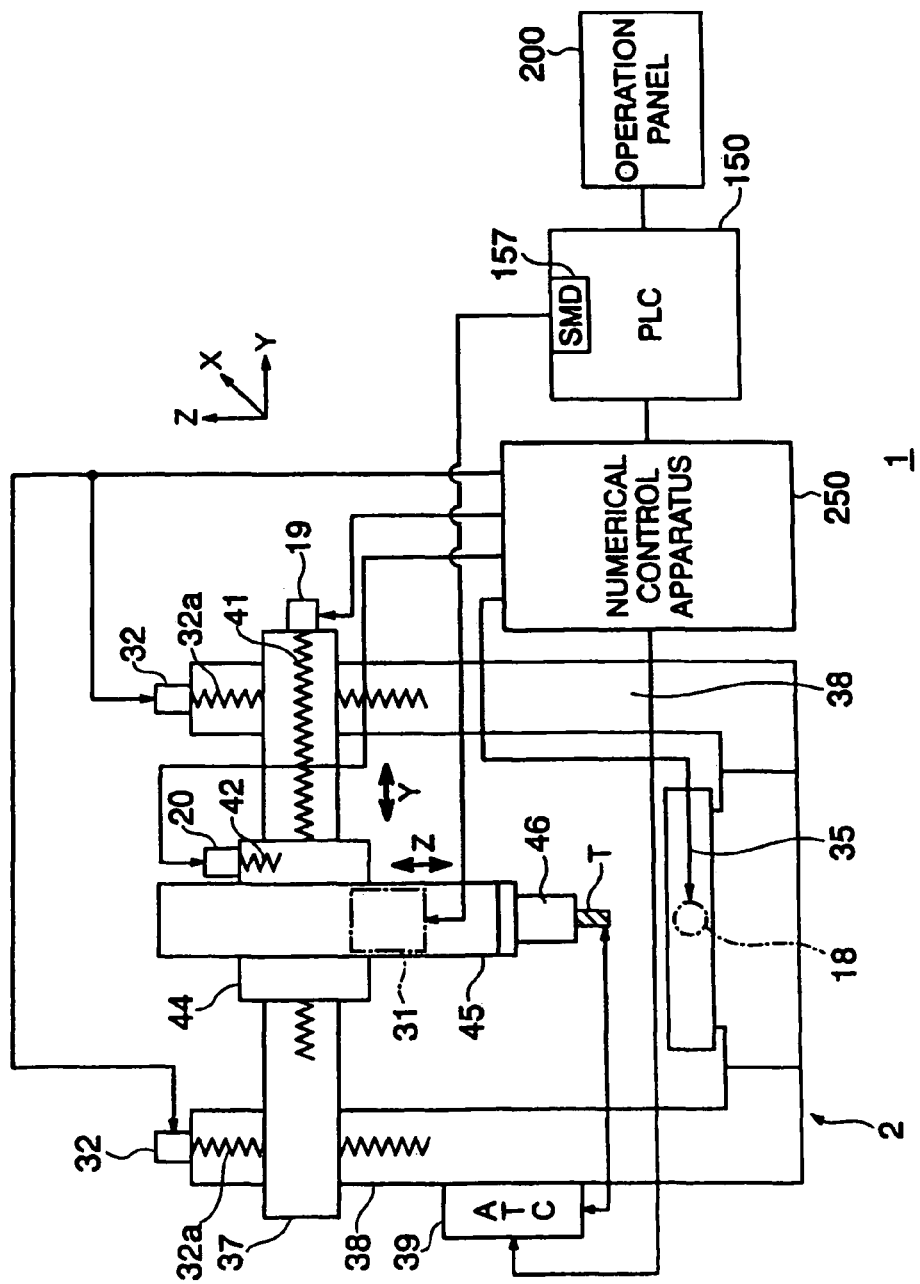
FIG. 1 is a view of the configuration of a machining center as an example of a machine tool according to the present invention.

The tool of the present invention generates electric power using the rotation of the spindle. Due to this, even when the cutting tool is overloaded while machining, the spindle is driven continuously. Therefore, there is a possibility of an excessive current flowing in the generator or the motor. Accordingly, in the present invention, if a current over a predetermined value flows through the supply line from the generator to the motor, the generator and the motor are protected by breaking the supply line.

Also, the driving state of the motor is detected by the driving state detecting means and is fed back to the control means to control the motor. By this, it becomes possible to control the tool independently of the spindle, variously, and precisely.

Further, the tool is provided with a light signal generating means and a light guiding means, generates a light signal in response to the rotational speed of the motor by the light generating means using light input from outside, and outputs the light signal to the outside. By detecting the rotational speed of the motor based on the output light signal, no light source or light receiving device need be built in the tool and it becomes possible to make the tool more compact.

The tool attached to the spindle is provided with a generator and a motor, generates electric power by the rotation of the spindle, and drives the motor with the generated electric power to rotate the cutting tool. When the motor rotates, the rotational speed is detected by the rotational speed detecting means and is displayed visually recognizably by a rotational speed display means. Due to this, it is possible to easily grasp the driving state of the tool.

Below, an explanation will be made of embodiments of the present invention by referring to the drawings.

First Embodiment

FIG. 1 is a view of the configuration of a machining center as an example of a machine tool according to the present invention. Note that the machining center is a numerical control machine tool capable of so-called combined machining.

The machining center 1 is provided with a machine tool body 2, a numerical control apparatus (NC apparatus) 250, and a programmable logic controller (PLC) 150.

In FIG. 1, the machine tool body 2 is provided with a cross rail 37 having two ends movably supported by shafts of a double housing type column 38. A ram 45 is provided movably in a vertical direction (Z-axis direction) via a saddle 44 supported movably on this cross rail 37.

The saddle 44 is provided with a not illustrated nut part passing through the cross rail 37 in a horizontal direction. A feed shaft 41 with a screw part formed on the outer circumference is screwed into this nut part.

A servo motor 19 is connected with an end of the feed shaft 41. The feed shaft 41 is driven to rotate by the servo motor 19.

By the rotation of the feed shaft 41, the saddle 44 moves in the Y-axis direction. By this, the ram 45 is moved and positioned in the Y-axis direction.

Further, the saddle 44 is provided with a not illustrated nut part in the vertical direction. The feed shaft 42 with a screw part formed on the outer circumference is screwed into this nut part. A servo motor 20 is connected with an end of the shaft 42.

The servo motor 20 drives the feed shaft 42 to rotate. By this, the ram 45 movably provided on the saddle 44 is moved and positioned in the Z-axis direction.

The ram 45 has built into it a spindle motor 31. This spindle motor 31 rotates a spindle 46 rotatably supported by the ram 45. A tool T such as an end mill is attached at the front end of the spindle 46. The tool is driven by the rotation of the spindle 46.

Below the ram 45, a table 35 is provided movably in the X-axis direction. The table 35 is provided with a not illustrated nut part. A not illustrated nut feed shaft provided along the X-axis direction is screwed into this nut part. This not illustrated feed shaft is connected to the servo motor 18.

The table 35 is moved and positioned in the X-axis direction by the rotation and driving of the servo motor 18.

Further, the double housing column 38 is provided with a not illustrated nut part. The cross rail 37 is raised and lowered by the rotation of the feed shaft 32a screwed into it by a cross rail elevation servo motor 32.

An automatic tool changer (ATC) 39 automatically changes the tool T attached to the spindle 46.

That is, the automatic tool changer 39 holds various tools in its not illustrated magazine, returns a tool T attached to the spindle by a not illustrated tool changing arm into the magazine, and attaches a required tool held by the magazine to the spindle by the tool changing arm.

The NC apparatus 250 drives and controls the above servo motors 18, 19, and 20, and the cross rail elevation servo motor 32.

Specifically, the NC apparatus 250 controls the positions and the speeds between a workpiece and the tool T by the servo motors 18, 19, and 20 according to a machining process defined in advance in a machining program. Further, the NC apparatus 250 controls the rotational speed of the spindle 46 by decoding the rotational speed of the spindle 46 defined by an S-code in the machining program.

Still further, the NC apparatus 250 automatically changes various tools by decoding the tool changing operation of the tool T defined by for example an M-code in the machining program.

The PLC 150 is connected to the NC apparatus 250 and the operational panel 200. The PLC 150 performs various kinds of sequence control for example starting and stopping the machining center 1 in accordance with a predetermined sequence program, outputting signals to switch on and off the display part of the operational panel 200, etc. Further, the PLC 150 is connected to a spindle motor driver 157 to drive and control the spindle motor 31. The PLC 150 outputs control commands to start and stop the spindle motor 31 and control its speed to the spindle motor driver 157.

Figure 2:
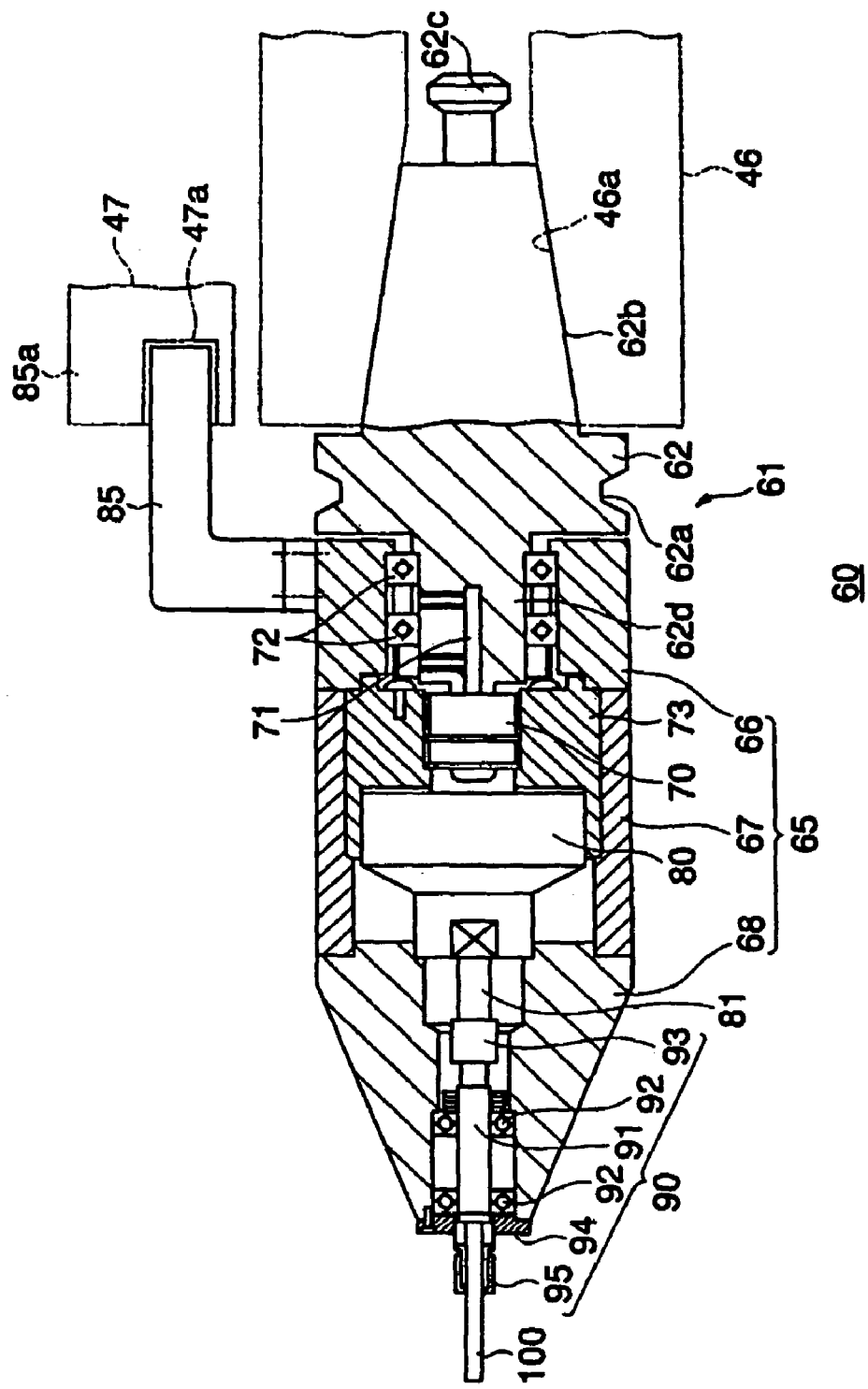
FIG. 2 is a sectional view of a tool according to the first embodiment of the present invention.

FIG. 2 is a sectional view of a tool according to the first embodiment of the present invention.

In FIG. 2, a tool 60 is comprised of a cutting tool 100 and a tool holder 61. Note that the cutting tool 100 is an embodiment of a machining tool according to the present invention. Further, the tool 60 according to the present embodiment is attached to the spindle 46 by the automatic tool changer 39 in the same way as the above ordinary tool T.

The tool holder 61 has an attachment part 62, a casing 65 comprised of casing parts 66, 67, and 68, a generator 70, a motor 80, a tool holding part 90, and a locking part 85.

The attachment part 62 is provided with a grip 62a, a taper shank 62b to be attached to a taper sleeve 46a formed at the front end of the above spindle 46, a pull stud 62c formed at the front end of this taper shank 62b, and a shaft 62d rotatably held by the casing part 66.

The grip 62a of the attachment part 62 is gripped by the above tool changing arm of the automatic tool changer 39 when the tool 60 is being attached to the spindle 46 from the magazine of the automatic tool changer 39 and when the tool 60 is being conveyed from the spindle to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a not illustrated clamping mechanism built in the spindle 46 when the attachment part 62 is attached to the taper sleeve 46a of the spindle 46. Note that the clamping mechanism built in the spindle 46 is well known, so a detailed explanation will be omitted.

The shaft 62d of the attachment part 62 is supported rotatably held by the inner circumference of the casing part 66 via a plurality of bearings 72. As the bearing 72, a sealed ball bearing can be used.

The sealed ball bearing is called a capped bearing in the JIS (Japan Industrial Standard) or the ISO (International Standard Organization).

A sealed ball bearing is for example a bearing where grease is sealed into a space enclosed by sealing parts arranged at the two sides of an inner ring and an outer ring.

By using such a sealed ball bearing, it is not necessary to form passages for supply and discharge of lubricating oil in the tool 60 and it becomes possible to make the tool 60 more compact.

The generator 70 and the motor 80 are held by the inner circumference of the casing part 67 via a holding part 73.

The shaft 62d of the attachment part 62 is connected with the input shaft 71 of the generator 70. As this generator 70, for example, a three-phase synchronous generator can be used.

Figure 3:
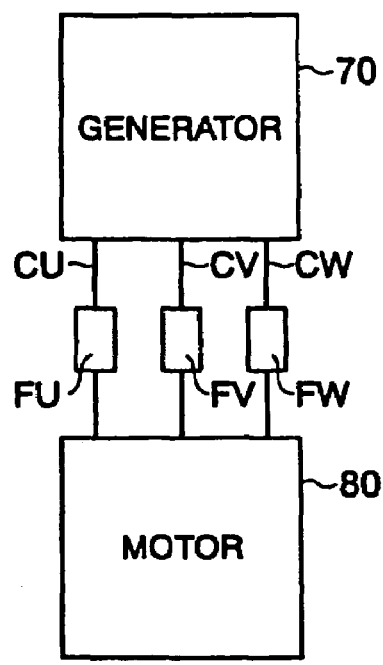
FIG. 3 is a view of the connection state of a motor and generator.

As shown in FIG. 3, the motor 80 is connected to the generator 70 with three conductor cables CU, CV, and CW. The electric power generated by the generator 70 is supplied to the motor 80. The motor is driven by the electric power supplied from the generator 70.

As this motor 80, for example, a three-phase induction motor can be used.

Fuses FU, FV, and FW are respectively arranged at the middles of the above conductor cables CU, CV, and CW.

The fuses FU, FV, and FW are arranged at predetermined locations in the above casing 60.

These fuses FU, FV, and FW break the circuit between the motor 80 and the generator 70 for example by melting when current over a predetermined value flows in the conductor cables CU, CV, and CW. By this, it becomes possible to avoid damage by heat caused by excessive current in the generator 70 and the motor 80.

As the fuse Fu, FV, or FW, for example, a member comprised of an aluminum, zinc, copper, or other member accommodated in a cylinder made of glass or fiber can be used.

In FIG. 2, the tool holding part 90 has a shaft 91, a coupling 93 for connecting this shaft 91 and the output shaft 81 of the motor 80, and a tool attachment part 95. Note that the shaft 91 and the shaft 81 are embodiments of a driving shaft according to the present invention.

The shaft 81 of the motor 80 is rotatably held by a not shown bearing. As the bearing, a sealed ball bearing can be used.

The shaft 91 is rotatably held by the inner circumference of the casing part 68 via a plurality of bearings 92. As the bearings 92, sealed ball bearings can be used.

The shaft 91 is stopped by a stopper 94 at the casing part 68 at its front end side.

The cutting tool 100 is held by the tool attachment part 95. This cutting tool 100 machines a workpiece. Note that the tool attachment part 95 is an embodiment of the tool attachment part according to the present invention.

Specifically, as the cutting tool 100, a cutting tool such as a drill or an end mill may be used.

The casing parts 66, 67, and 68 are connected to each other by clamping means such as bolts. The casing 65 is constructed by these casing parts 66, 67, and 68.

The locking part 85 is mounted on the outer circumference of the casing part 66.

When the attachment part 62 is attached to the taper sleeve 46a of the spindle 46, the front end of the locking part 85 is inserted to an engagement hole 47a formed at a non-rotating part such as the ram 45 on the spindle 46 side.

Due to this, even if the spindle 46 is rotated, rotation of the casing 65 is prevented.

Next, an explanation will be made of an example of the operation of the above configured tool 60.

First, the automatic tool changer 39 attaches the tool holder 61 holding the cutting tool 100 at the tool attachment part holder 95 to the spindle 46 of the machining center 1. The front end 85a of the locking part 85 is inserted into the engagement hole 47a of the non-rotating part 47 whereby the rotation of the casing 65 is prevented.

By rotating the spindle 46 at the rotational speed $N_0$ from this state, the attachment part 62 of the tool holder 61 is rotated and the rotation of the spindle 46 is transmitted to the generator 70. By this, the generator 70 generates electric power. In the case of a three-phase synchronous generator used as the generator 70, the generator 70 generates three-phase alternating current.

The frequency F of the three-phase alternating current generated by the generator 70 is expressed by the following formula (1) where the number of poles of the generator 70 is $p_1$ and the rotational speed of the spindle 46 is $N_0$ [min$^{-1}$]:

$$F = p_1 * N_0 / 120 \text{ [Hz]} \tag{1}$$

Accordingly, when the spindle 46 is rotated at the rotational speed $N_0$, a three-phase alternating current having the frequency F expressed the above formula (1) is supplied to the motor 80.

Here, in case where a three-phase induction motor is used as the motor 80, if the number of poles of the motor 80 is $p_2$, the motor 80 is rotated by $2/p_2$ per cycle of the three-phase alternating current.

Therefore, the synchronous rotational speed of the motor 80 is expressed by the following formula (2):

$$N_1 = 120 * F / p_2 \text{ [min}^{-1}\text{]} \tag{2}$$

Accordingly, the relationship of the rotational speed $N_1$ of the cutting tool 100 to the rotational speed $N_0$ of the spindle 46 is expressed by the following formula (3):

$$N_1 = N_0 * p_1 / p_2 \text{ [min}^{-1}\text{]} \tag{3}$$

As understood from formula (3), the rotational speed $N_0$ of the spindle 46 is changed to the rotational speed $N_1$ expressed by the above formula (3).

As expressed by the formula (3), it is found that by appropriately setting the ratio between the number of poles $p_1$ of the generator 70 and the number of poles $p_2$ of the motor 80, it is possible to freely set the ratio of the rotational speed of the cutting tool 100 to the rotational speed of the spindle 46.

That is, when trying to raise the rotational speed of the cutting tool 100 higher than that of the spindle 46, the ratio of the number of poles $p_1/p_2$ is set larger than 1. When trying to reduce the rotational speed of the cutting tool 100 to lower than that of the spindle 46, the ratio of the number of poles $p_1/p_2$ is set smaller than 1.

When machining a workpiece such as aluminum alloy, sometimes the rotational speed of the cutting tool 100 is raised higher than the maximum rotational speed of the spindle 46.

In such a case, the tool 60 is held in advance in the magazine of the automatic tool changer 39 of the machining center 1.

For example, when the maximum rotational speed Nmax of the spindle 46 of the above machining center 1 is 3000 [min$^{-1}$] and the rotational speed of the cutting tool 100 is raised to 30,000 [min$^{-1}$], the generator 70 and the motor 80 having a ratio of the number of poles $p_1/p_2$ of 10 are used.

The automatic tool changer 39 attaches the tool 60 automatically to the spindle 46 in the same way as an ordinary tool. Note that an ordinary tool is a cutting tool clamped by a tool holder.

The rotational speed of the cutting tool 100 held by the tool holder 61 is controlled by the rotational speed of the spindle 46. Specifically, in the machining program downloaded at the NC apparatus 250, the rotational speed of the spindle 46 is designated in advance by an S-code in accordance with the rotational speed of the cutting tool 100 held by the tool holder 61.

For example, when rotating the cutting tool 100 at the rotational speed of 30,000 [min$^{-1}$], the rotational speed of the spindle 46 is designated as 3000 [min$^{-1}$] by the S-code in the machining program.

When the spindle 46 is rotated at the rotational speed of 3000 [min$^{-1}$], the generator 70 generates a three-phase alternating current having a frequency in accordance with the rotational speed of the spindle 46 and the number of poles of the generator 70 and motor 80.

The motor 80 is driven by the three-phase alternating current supplied from the generator 70, while the cutting tool 100 held by the tool holder 61 is rotated at the rotational speed of about 30,000 [min$^{-1}$].

In the above state where the rotational speed of the cutting tool 100 is increased, the workpiece is cut by moving the workpiece fixed on the table 35 relative to the cutting tool 100 (spindle 46) in accordance with the machining program.

Due to this, it becomes possible to suitably cut a workpiece such as an aluminum alloy.

In this way, according to the present embodiment, the rotational speed of the cutting tool 100 is raised by driving the motor 80 by the electric power generated by the generator 70. Due to this, even if the spindle 46 is rotated at a high rotational speed, heat is not increasingly generated such as in a gear apparatus, so a reduction of the machining tolerance due to the heat can be avoided.

Further, according to the present embodiment, it is possible to make the inertia of the motor 80 smaller than the inertia of the spindle 46. Therefore, it becomes possible to improve the response of the cutting tool 100 compared with when directly rotating the spindle 46 at a higher rotational speed.

Further, according to the present embodiment, a tool 60 which increases the rotational speed of the spindle 46 can be attached to the spindle 46 and be changed by the automatic tool changer 39 in the same way as an ordinary tool. Therefore, it is possible to immediately respond to a request for machining at a higher speed while machining within an ordinary rotational speed.

Further, according to the present embodiment, the cutting tool 100 is driven by the electric power generated by the rotation of the spindle 46. Therefore, it is not necessary to supply a driving current from the outside. As a result, a cable for supplying electric power is not needed.

Further, according to the present embodiment, when the cutting tool 100 is overloaded while machining, it is possible to prevent the excessive current from flowing to the generator 70 and the motor 80 and to reliably avoid damage to the generator 70 and the motor 80 by heat.

Second Embodiment

Figure 4:
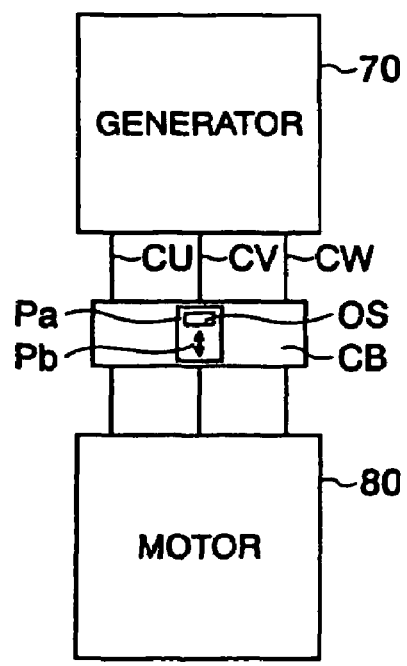
FIG. 4 is a view of the connection state of a motor and generator in a tool according to a second embodiment of the present invention.

FIG. 4 is a view of the connection state of a motor and generator in a tool according to a second embodiment of the present invention. Note that the rest of the configuration of the tool according to the present embodiment is the same as in the above mentioned embodiment.

As shown in FIG. 4, in the present embodiment, a circuit breaker CB is arranged in the middle of the conductor cables CU, CV, and CW connecting the generator 70 and the motor 80 and is provided with an operational part OS.

The circuit breaker CB breaks the circuit between the motor 80 and the generator 70 when current over a predetermined value flows in the conductor cables CU, CV, and CW.

The operational part OS is movable between a connecting position Pa to connect a circuit and a breaking position Pb to break a circuit. When the circuit breaker is broken, the operational part OS located at the connecting position Pa is automatically moved to the breaking position Pb.

By operating the operational part OS from the breaking position Pb to the connecting position Pa again, the circuit between the motor 80 and the generator 70 are connected again.

Figure 5:
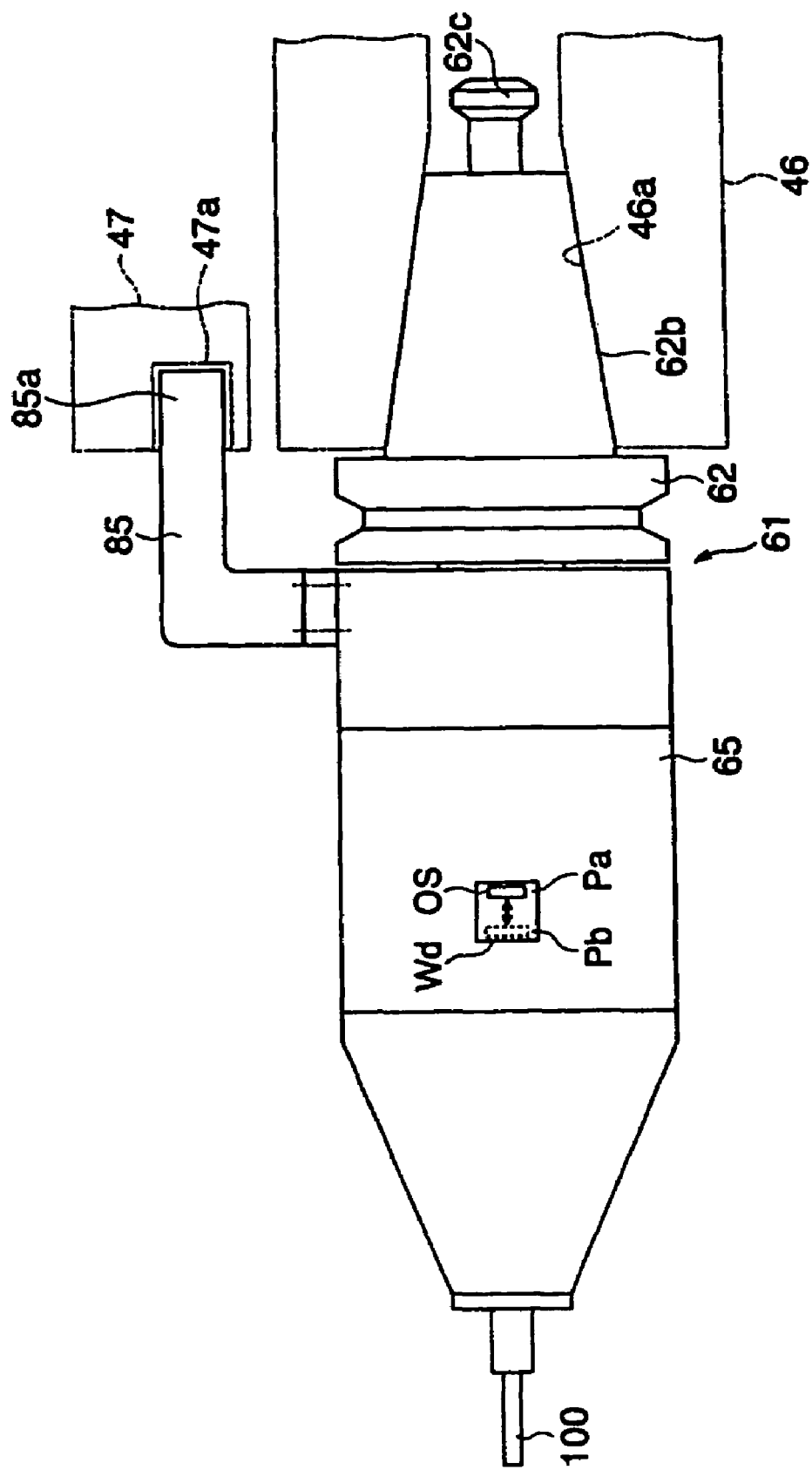
FIG. 5 is a view of the appearance of a tool according to a second embodiment of the present invention.

FIG. 5 is a view of an example of the arrangement of the above circuit breaker in the tool.

As shown in FIG. 5, the operational part OS of the circuit breaker CB is arranged on the casing 65 and is visually recognizable and operable from the outside through a window Wd.

For example, when the circuit breaker CB detects excessive current and the operational part OS is moved to the breaking position Pb while machining, it is possible for an operator to visually recognize that the circuit between the motor 80 and the generator 70 is broken due to an excessive current.

Further, the operator can connect the circuit between the motor 80 and the generator 70 again by operating the operational part OS from the breaking position Pb to the connecting position Pb.

In this way, according to the present embodiment, besides being able to protect the motor 80 and the generator 70 from excessive current, it becomes possible to improve the ease of operation.

Third Embodiment

Figure 6:
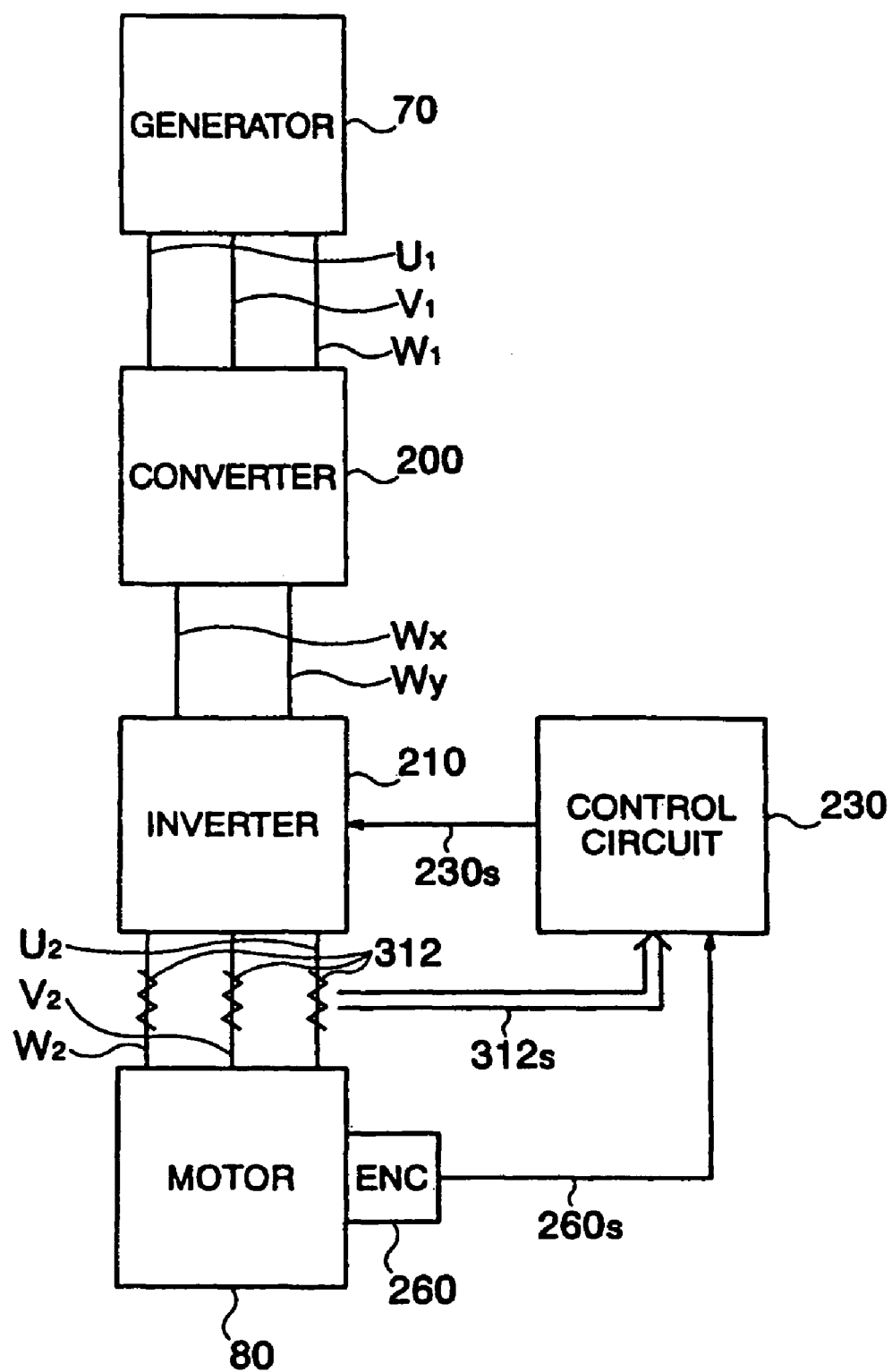
FIG. 6 is a view of the connection state of a motor and generator in a tool according to a third embodiment of the present invention.

FIG. 6 is a functional block diagram of the electrical system of a tool according to the present embodiment. Note that the mechanical structure of the tool according to the present embodiment is the same as in the above mentioned first embodiment.

As shown in FIG. 6, the tool according to the present embodiment is provided with a converter 200, an inverter 210, and a control circuit 230 in addition to the generator 70 and the motor 80. Note that the converter 200, the inverter 210, and the control circuit 230 form an embodiment of the control means of the present invention. Further, as the generator 70, a three-phase synchronous generator can be used. As the motor 80, a three-phase induction motor can be used. Further, the converter 200, the inverter 210, and the control circuit 230 are housed in the above casing 65.

The converter 200 is connected to the generator 70 by conductor cables U1, V1, W1 and is electrically connected to the inverter 210 by conductor cables Wx and Wy.

The inverter 210 is connected to the motor 80 by conductor cables U2, V2, and W2. The inverter 210 converts a direct current supplied from the converter 200 into a three-phase alternating current and supplies a driving current to drive the motor 80 via the conductor cables U2, V2, and W2 in accordance with pulse width modulation (PWM) signal 230s input from the control circuit 230.

The control circuit 230 outputs the PWM signal 230s for controlling the driving current supplied from the inverter 210 to the motor 80 through the conductor cables U2, V2, and W2 to the inverter 210. The PWM signal 230s controls the turn-on width of current of the inverter 210. The current value signal 312s of the current detector 312 detecting the driving current supplied to the motor 80 and the position signal 260s of the rotational position detector 260 attached to the motor 80 are input to the control circuit 230. Note that the current detector 312 and the rotational position detector 260 are an embodiment of the driving state detecting means of the present invention for detecting the state of the motor 80.

The control circuit 230 generates the PWM signal 230s for driving and controlling the motor 80 by using the current value signal 312s of the current detector 312 and the positional signal 260s of the rotational position detector 260 and gives this to the inverter 210.

Next, an explanation will be made of an example of the operation of the tool 60 according to the present embodiment.

The generator 70, a three-phase synchronous generator, generates a three-phase alternating current to be supplied to the converter 200. The frequency F of the three-phase alternating electric power generated by the generator 70 becomes a value in accordance with the rotational speed $N_0$ of the spindle 46.

The current converted to a direct current by the converter 200 is supplied to the inverter 210, is converted to a three-phase alternating current with a frequency F in accordance with the PWM signal 230s from the control circuit 230, and is supplied to the motor 80.

By controlling the frequency F of the alternating current supplied to the motor 80 by the control circuit 230, it becomes possible to variably control the rotational speed $N_0$ of the motor 80, that is, the rotational speed of the cutting tool 100, and to independently set the rotational speed $N_0$ of the motor 80 with regard to the rotational speed $N_0$ of the spindle 46.

Control of Electric Motor

The control of the motor 80 by the control circuit 230 is open-loop control for changing the electric power generated by the generator 70 into a three-phase alternating current with a frequency F by the inverter 210 to drive the motor 80 at a rotational speed in accordance with the frequency F.

Accordingly, if the load given to the cutting tool 100 (the motor 80) is changed while machining a workpiece by moving the workpiece relative to the cutting tool 100 in accordance with the machining program, there is a possibility that a uniform quality of machining will not be possible.

Due to this, in the present embodiment, the position signal 260s showing the rotational position of the motor 80, the current value signal 312 showing the driving current of the motor 80, or other driving state of the motor 80 is detected, this is fed back to the control circuit 230, and the motor 80 is controlled by using the position signal 260s and the current value signal 312s.

The control circuit 230 can convert the position signal 260s into the actual rotational speed of the motor 80 and use this information to control the motor 80 so as to maintain it at the desirable speed independently of a change of the load given to the cutting tool 100.

Further, the control circuit 230 can control the motor 80 using the current value signal 312s so as to keep the torque generated by the motor 80 constant independently of a change of the load given to the cutting tool 100.

According to the present embodiment, since the tool 60 is provided with a converter 200, inverter 210, and control circuit 230 for controlling the supply of the electric power generated by the generator 70 to the motor 80 and provided with a rotational position detector 260, current detector 312, or other driving state detecting means for detecting the rotational speed, the driving current, or other driving state of the motor 80, it becomes possible to control the motor precisely.

Note that the method of driving and controlling the motor 80 by the control circuit 230 described in the above embodiment is only an example. The present invention is not limited to the above driving and controlling method. It is possible to employ other different kinds of driving and controlling methods.

Further, in the above embodiment, a rotation position detector 260 and current detector 312 were illustrated as the driving state detecting means of the motor 80, but the present invention can also be applied to a driving state detecting means such as a taco-generator for detecting the rotational speed of the motor 80, a torque sensor for detecting the torque related the shaft of the motor 80, or other sensor for detecting the driving state of the motor 80.

Fourth Embodiment

Figure 7:
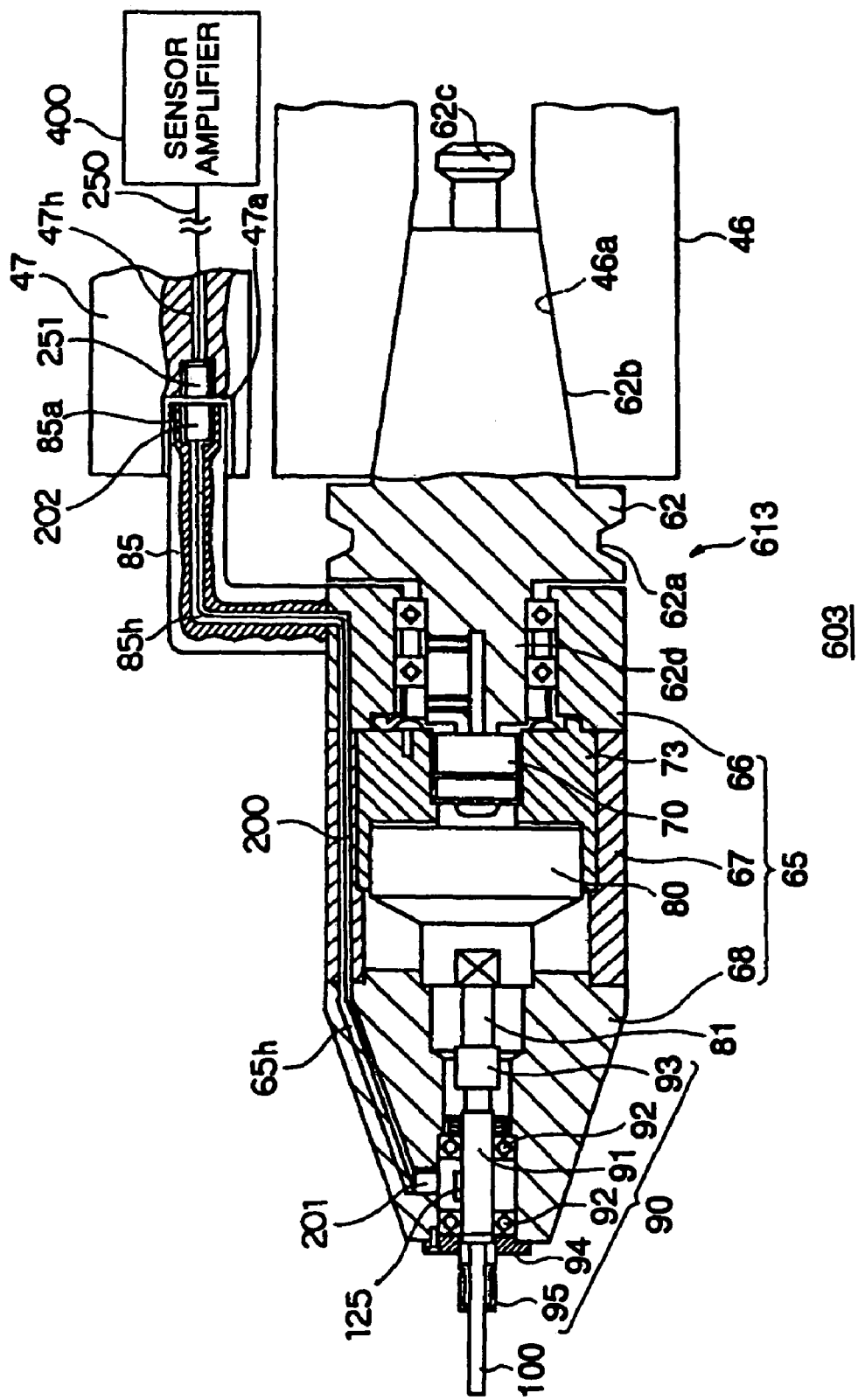
FIG. 7 is a view of the configuration of a tool according to a fourth embodiment of the present invention.

FIG. 7 is a sectional view of an embodiment of a tool according to the present invention.

In FIG. 7, the tool 603 is comprised of a cutting tool 100 and a tool holder 613 for holding the cutting tool 100. Note that the same references are used for the same parts as in the tool according to the first embodiment in FIG. 7.

Rotation Detecting Mechanism

The above tool 603 is provided with an optical fiber 200 inserted in a through hole 65h formed in the casing 65 and a through hole 85h communicated with the through hole 65h and formed in the locking part 85, an optical part 201 connected to one end of the optical fiber 200, an optical part 202 connected to the other end of the optical fiber 200, and a reflecting mirror 125 mounted on the shaft 91 of the motor 80. Note that the optical fiber 200 and the optical parts 201 and 202 constitute an embodiment of the light guiding means according to the present invention. The reflecting mirror 125 is an embodiment of the light signal generation means according to the present invention.

On the spindle 46 side, an optical part 251 arranged in the fitting hole 47a of the non-rotation portion 47, an optical fiber 250 connected to the optical part at its one end and inserted into a through hole 47h formed in the non-rotation portion 47, and a sensor amplifier 400 connected to the other end of the optical fiber 250 are arranged. Note that the optical part 251, the optical fiber 250, and the sensor amplifier 400 constitute an embodiment of a light receiving and emitting means according to the present invention.

Figure 8:
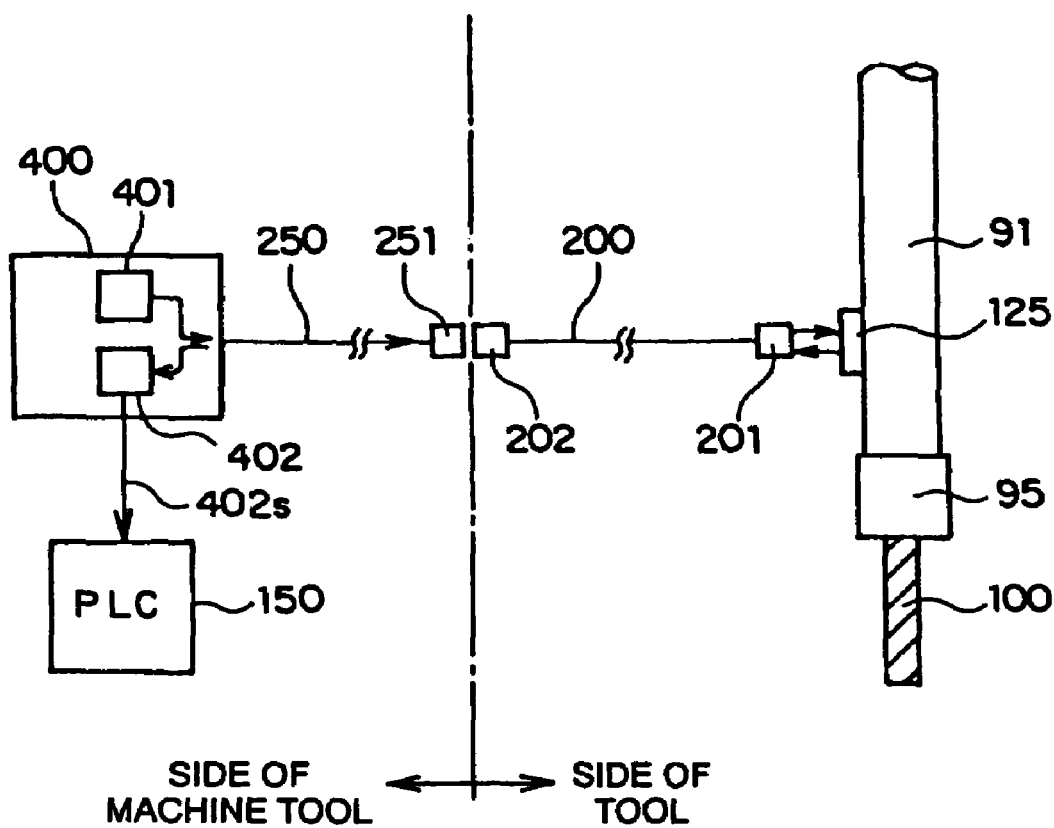
FIG. 8 is a view of a main configuration for detecting the rotational speed of a motor.

FIG. 8 is a view of the main configuration for detecting the rotational speed of the motor 80.

In FIG. 8, The optical part 201 is fixed at a position facing the shaft 91 of the motor 80. The optical part 201 outputs the light guided by the optical fiber 200 to the shaft 91 and guides the light reflected from the shaft 91 to the optical fiber 200.

When the locking part 85 is fit with the fitting hole 47a of the non-rotation portion 47, the optical part 202 is arranged facing the optical part 251. The optical part 202 guides the light output from the optical part 251 to the optical fiber 200 and outputs the light reflected at the shaft 91 through the optical fiber 200 to the optical part 251.

The optical part 251 outputs the light from the sensor amplifier 400 through the optical fiber 250 to the optical part 202 and guides the light reflected at the shaft 91 output from the optical part 202 to the optical fiber 250.

The sensor amplifier 400 is provided with a light emitting element 401 and a light receiving element 402. The light emitting element 401 is comprised of for example a laser diode. The light receiving element 402 is comprised of for example a photo diode.

The sensor amplifier 400 outputs light to the optical fiber 250 by the light emitting element 401 and receives the light reflected at the shaft 91 input through the optical fiber 250 by the light receiving element 402.

The light receiving element 402 converts the received light to an electric signal in accordance with its intensity and outputs the signal 402s to the PLC 150.

The PLC 150 detects the rotational speed of the motor 80 based on the signal 402s from the sensor amplifier 400. Further, the PLC 150 outputs the detected rotational speed of the motor 80 to the NC apparatus 250. Note that the PLC 150 is an embodiment of a rotational speed detecting means according to the present invention.

Next, an explanation will be made of an example of the operation of the tool 603 according to the present embodiment.

When the front end 85a of the locking part 85 is inserted to and fit with the fitting hole 47a, the above optical part 202 faces the optical part 251.

Here, if the light emitting element 401 of the sensor amplifier 400 outputs light, the light is input to the optical part 202 without contact through the optical fiber 250 and the optical part 251. The light input to the optical part 202 is output from the optical part 201 to the shaft 91 through the optical fiber 200.

When the spindle 46 is rotated at the rotational speed No from this state, the tool attachment part of the tool 603 is rotated so that the rotation of the spindle 46 is transmitted to the generator 70.

Due to this, for example a three-phase synchronous generator generates three-phase alternating current as the generator 70.

The motor 80 is driven by the three-phase alternating current supplied from the generator 70.

While the shaft 91 of the motor 80 is rotating, when the reflecting mirror 125 arranged on the shaft 91 moves to a position facing to the optical part 201, the reflecting mirror 125 reflects the light from the optical part 201 to the optical part 201. Accordingly, a light signal having an intensity in accordance with the rotational speed of the shaft 91 is input to the optical part 201.

The light signal having an intensity in accordance with the rotational speed of the shaft 91 is input to the light receiving element 402 of the sensor amplifier 400 through the optical fibers 200 and 250. The light receiving element 402 converts the light signal into an electric signal and outputs the electric signal 402s to the PLC 150.

The PLC 150 detects the rotational speed of the motor 80 based on the signal 402s and outputs the detected rotational speed to the NC apparatus 250.

Due to this, the NC apparatus 250 can monitor the rotational speed of the motor 80 at all times. Further, the NC apparatus 250 can also control the rotation of the motor 80 indirectly by controlling the rotation of the spindle 46 using the detected rotational speed of the motor 80.

According to the present embodiment, by arranging only the optical part, the optical fiber, and the reflecting mirror at the tool 603 side and arranging the light emitting element or the light receiving element outside of the tool 603, the rotational speed of the motor 80 built in the tool 603 is detected. Due to this, it becomes possible to make the structure of the tool 603 simple and compact and suitable for automatic tool changing.

Note that in the above embodiment, the reflecting mirror 125 is mounted on the shaft 91, but it is also possible to mirror finish part of the shaft 91. Further, it is possible to arrange a plurality of reflecting mirrors 125 along the circumferential direction of the shaft 91.

Further, the method of detecting the rotational speed of the motor 80 is not limited to the above method using the reflecting mirror 125. It is possible to for example arrange a disk having a through hole on the shaft 91, output light from one side of the disk and receiving the passed light at the other side of the disk, and generate a light signal in response to the rotational speed of the motor 80. That is, it is possible to employ any configurations supplying light from outside of the tool 603, generating a light signal in accordance with the rotational speed of the motor 80, and outputting this light signal to the outside.

Fifth Embodiment

Figure 9:
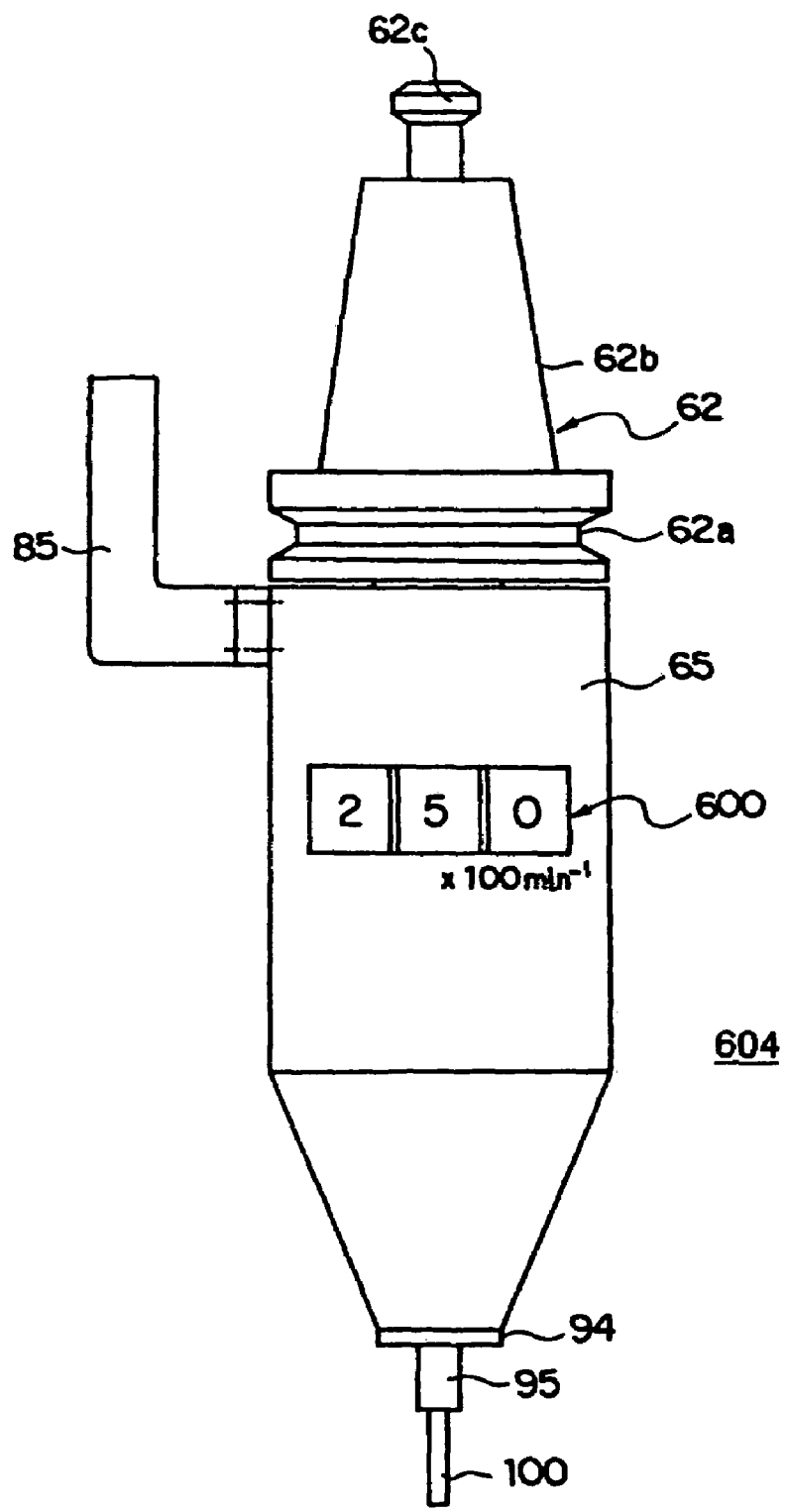
FIG. 9 is a view of the configuration of a tool according to a fifth embodiment of the present invention.

FIG. 9 is a front view of the configuration of another embodiment according to the present invention. Note that the same references are used for the same parts as in the above mentioned embodiments in FIG. 9.

As shown in FIG. 9, the tool 604 according to the present embodiment is provided with a digital display 600 on the outer surface of the casing 65. The digital display 600 displays the rotational speed of the motor built in the tool 604.

Figure 10:
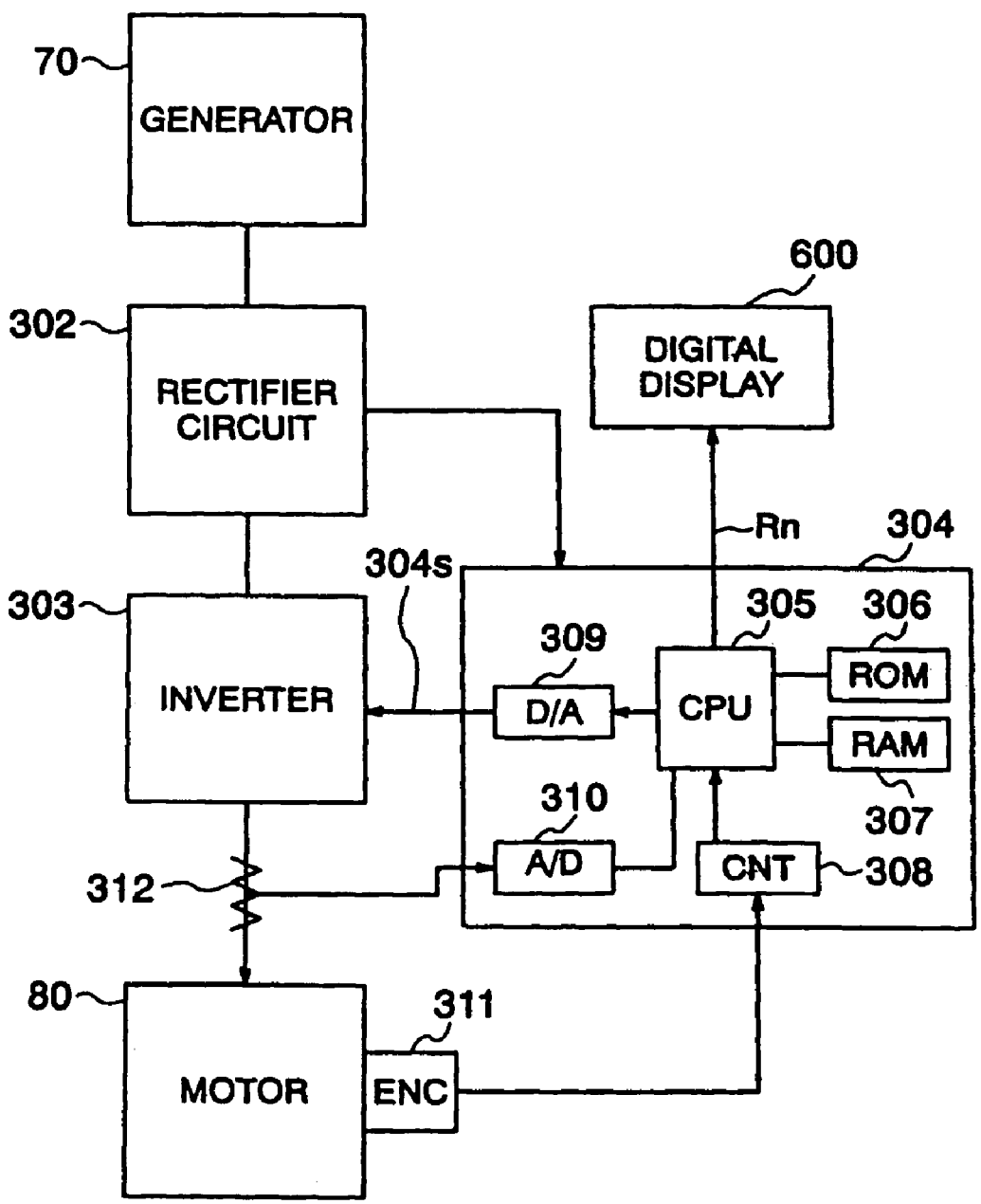
FIG. 10 is a view of the configuration of an electrical system of a tool according to a fifth embodiment of the present invention.

FIG. 10 is a view of the configuration of the tool 604 according to the present embodiment.

The tool 604 according to the present embodiment has built into it the generator 70 and the motor 80 in the same way as the above tool 60 according to the first embodiment. The rotation of the spindle 46 is transmitted to the generator 70 through the attachment part 62 so that the generator generates electric power. As the generator 70, a three-phase synchronous generator can be used.

The tool 604 according to the present embodiment is provided with a rectifier circuit 302, an inverter 303, and a control circuit 304 in addition to the generator 70 and the motor 80. The rectifier circuit 302, the inverter 303, and the control circuit 304 are built in the above casing 65.

The rectifier circuit 302 rectifies the alternating current generated by the generator 70 and supplies it to the inverter 303.

Further, the rectifier circuit 302 supplies a part of the rectified direct current to the control circuit as a power supply.

The inverter 303 is an inverter for changing the direct current supplied from the rectifier circuit 302 into alternating current having a frequency necessary for driving the motor 80. For example, the inverter 303 is configured by a pulse width modulation (PWM) inverter.

The control circuit 304 is provided with a microprocessor 305, a read only memory (ROM) 306, a random access memory (RAM) 307, a counter circuit 308, an analog-to-digital (A/D) converter 310, and a digital-to-analog (D/A) converter 309.

The ROM 306 stores a control program for controlling the motor 80. The control program performs for example variable speed control of the motor 80 by field-oriented control.

The RAM 307 stores data for operations of the microprocessor 305.

The microprocessor 305 executes the control program stored in the ROM 306, performs various operations, and outputs control signals 304s to the inverter 300 via the D/A converter 309. The control signals 304s are for example PWM control signals.

Further, the microprocessor 305 detects the rotational speed of the motor 80 and outputs the rotational speed information Rn of the motor 80 to the digital display 600.

The A/D converter 310 converts the value of the current supplied from the inverter 303 to the motor 80 detected by a current detector 312 into a digital signal and outputs this signal to the microprocessor 305.

The motor 80 is provided with a rotational position detector 311. As this rotational position detector 311, for example, an optical rotary encoder or a resolver may be used.

The counter circuit 308 counts pulse signals detected by the rotational position detector 311 in accordance with the rotation of the motor 80 and outputs the count to the microprocessor 305.

The above configured control circuit 304 can operate by receiving electric power generated by the generator 70 by the rotation of the spindle 46.

The control circuit 304 receives the rotation and the drive current of the motor 80 as input. Due to this, by preparing a desired control program in the ROM 306 of the control circuit 304 in advance, various types of control of the motor 80 becomes possible.

For example, when a synchronous motor is used as the motor 80 and it is intended to variably control the speed of this synchronous motor, velocity reference data is set in advance in the ROM 306. By this, speed control of the motor 80 becomes possible in accordance with this velocity reference data.

Next, an explanation will be made of an example of the operation of the above configured tool 604.

The alternating current generated by the generator 70 is rectified by the rectifier circuit 302 and supplied to the control circuit 304 and the inverter 303.

When electric power is supplied to the control circuit 304, the control circuit 304 starts to operate and executes a program stored in the ROM 306. Due to this program, alternating current having a predetermined frequency is supplied from the inverter 303 to the motor 80, and the motor 80 is driven.

When the motor 80 is driven, a number of pulse signals in accordance with the rotational speed of the motor 80 are input from the rotation position detector 311 to the counter circuit 308. The counter circuit 308 sequentially counts the number of the pulse signals and outputs the count to the microprocessor 305.

The microprocessor 305 converts the rotational speed of the motor 80 based on the count input from the counter circuit 308 and controls the rotational position, the speed, the torque, etc. of the motor 80 using the rotational speed of the motor.

Further, the microprocessor 305 sequentially outputs the rotational speed information of the motor 80 to the digital display 600. By this, the present rotational speed of the motor 80 is displayed on the digital display 600.

In the present embodiment, the tool 604 is electrically independent of the spindle 46. Due to this, to obtain a grasp of the operational state of the tool 604, it is necessary to employ a configuration transmitting the information giving the operational state of the tool 604 to the outside of the tool 604 with a wireless apparatus etc. By arranging the digital display 600 on the casing 65, it becomes possible to easily obtain a grasp of the operational state of the tool 604.

Note that in the present embodiment, the digital display 600 displays the rotational speed of the motor 80, but it is also possible to display other information of the operational state of the motor 80 besides the rotational speed, for example, the current supplied to the motor 80. Further, it is also possible to display a plurality of information showing the operational state of the motor 80.

Furthermore, it is also possible to detect not only the operational state of the motor 80 but also that of the generator 70 and display this visually recognizable from the outside.

While the invention has been described with reference to specific embodiments chosen for purpose of illustration, it should be apparent that numerous modifications could be made thereto by those skilled in the art without departing from the basic concept and scope of the invention.

What is claimed is:

1. A machine tool comprising:
   a machine tool body provided with a spindle, a driving means for driving said spindle, and at least one control axis for changing a relative position between said spindle and a workpiece;
   a control apparatus for driving and controlling said driving means and control axis in accordance with a machining program; and
   a tool attachable to said spindle and provided with a machining tool for machining a workpiece, a motor for driving said machining tool, a generator for generating electric power by the rotation of said spindle, a rotational speed detecting means for detecting the rotational speed of said motor, and a rotational speed displaying means for displaying the rotational speed detected by said rotational speed detecting means so as to be visually recognized from the outside of the attachable tool.

2. A machine tool comprising:
   a machine tool body provided with a spindle, a driver configured to drive said spindle, and at least one control axis for changing a relative position between said spindle and a workpiece;
   a control apparatus configured to drive and control said driver and control axis in accordance with a machining program; and
   a tool attachable to said spindle and provided with a machining tool for machining a workpiece, a motor configured to drive said machining tool, a generator configured to generate electric power by the rotation of said spindle, a rotational speed detector configured to detect the rotational speed of said motor, and a rotational speed display configured to display the rotational speed detected by said rotational speed detector so as to be visually recognized from the outside of the attachable tool.

3. The machine tool of claim 2, wherein the generator is a three-phase synchronous generator.

4. The machine tool of claim 2, wherein the detector is an optical rotary encoder or a resolver.

5. The machine tool of claim 2, wherein the display is a digital display.

\* \* \* \* \*